(12) United States Patent
Madsen

(10) Patent No.: US 11,517,119 B1
(45) Date of Patent: Dec. 6, 2022

(54) COUCH-FLOOR GAP BUMPER

(71) Applicant: Melody Madsen, Rio Rancho, NM (US)

(72) Inventor: Melody Madsen, Rio Rancho, NM (US)

( * ) Notice: Subject to any disclaimer, the term of this patent is extended or adjusted under 35 U.S.C. 154(b) by 0 days.

(21) Appl. No.: 17/847,110

(22) Filed: Jun. 22, 2022

Related U.S. Application Data (63) Continuation-in-part of application No. 17/699,123, filed on Mar. 20, 2022, now Pat. No. 11,470,979.

(51) Int. Cl.
*A47C 17/86* (2006.01)
*A01M 29/30* (2011.01)
*A47C 7/62* (2006.01)

(52) U.S. Cl.
CPC .......... *A47C 17/86* (2013.01); *A01M 29/30* (2013.01); *A47C 7/62* (2013.01)

(58) Field of Classification Search
CPC .......... A47C 21/00; A47C 19/22; A47C 7/62; A47C 7/626; A47C 17/86; A01M 29/30
USPC ............... 5/658, 424, 924; 297/182, 463.2
See application file for complete search history.

(56) References Cited

U.S. PATENT DOCUMENTS

| | | | | |
|---|---|---|---|---|
| 4,924,644 A * | 5/1990 | Lewis | ............ | E04B 7/22 52/747.11 |
| 5,669,089 A * | 9/1997 | Dees | ............ | B25H 5/00 5/722 |
| 5,754,996 A * | 5/1998 | VanSwearingen | ... | A47C 21/028 5/503.1 |
| 7,805,781 B1 * | 10/2010 | Smith | ............ | A47C 17/86 5/663 |
| D663,557 S * | 7/2012 | Marler | ............ | D6/716 |
| 8,465,101 B1 * | 6/2013 | Alvarez | ............ | A47B 97/00 297/463.2 |
| D779,679 S * | 2/2017 | Sartain | ............ | D25/48.5 |
| 9,592,926 B2 * | 3/2017 | Dammeyer | ............ | B65D 5/2052 |
| 9,675,181 B2 * | 6/2017 | Caron | ............ | A47C 17/86 |
| D792,143 S * | 7/2017 | Caron | ............ | D6/719 |
| D792,144 S * | 7/2017 | Caron | ............ | D6/719 |
| 10,258,168 B2 * | 4/2019 | Cerri, III | ............ | A47C 27/087 |
| 10,426,277 B2 * | 10/2019 | Cerri, III | ............ | A47C 27/087 |
| 11,206,933 B2 * | 12/2021 | Serenson | ............ | A47D 15/00 |
| 11,470,979 B1 * | 10/2022 | Madsen | ............ | A01M 29/30 |
| 2009/0174248 A1 * | 7/2009 | Chisholm | ............ | A01K 1/035 297/463.2 |

(Continued)

*Primary Examiner* — Robert G Santos
(74) *Attorney, Agent, or Firm* — Alexander Postnikov (57) ABSTRACT

A bumper designed to block a gap in between a couch and the floor, preventing household items, pets, and children from going into the space underneath couches, and, thus, eliminating messes, damage, injury, or loss. The bumper may be made of corrugated paper, heavy paperboard, or cardboard. The bumper may comprise a flat, rectangular body segmented into flat, rectangular sections using parallel folds, where the sections are configured to secure the bumper in between the couch and the floor. The bumper is setback from the couch frame perimeter to not be obtrusive, strong enough to resist inward pressure, and, in some embodiments, may contain cut lines and fold lines. A plurality of bumpers may, through a series of truncations, be customized to fully block access to the space underneath the couch for variety of couch lengths, widths, and heights.

2 Claims, 7 Drawing Sheets

(56) References Cited

U.S. PATENT DOCUMENTS

| | | | |
|---|---|---|---|
| 2012/0315434 A1* | 12/2012 | Marler | A47C 17/86 |
| | | | 428/121 |
| 2016/0068296 A1* | 3/2016 | Dammeyer | B65D 5/2052 |
| | | | 206/335 |
| 2016/0100695 A1* | 4/2016 | Harris | A47C 31/00 |
| | | | 428/12 |
| 2016/0220029 A1* | 8/2016 | Caron | A47C 17/86 |
| 2017/0290445 A1* | 10/2017 | Cerri, III | A47D 15/00 |
| 2019/0191892 A1* | 6/2019 | Cerri, III | A47D 15/00 |
| 2019/0261784 A1* | 8/2019 | Serenson | A47C 19/22 |

* cited by examiner

COUCH-FLOOR GAP BUMPER

CROSS-REFERENCE TO RELATED APPLICATIONS

This application claims the benefit of and is a Continuation-in-part of U.S. non-provisional application Ser. No. 17/699,123, titled "BED-FLOOR GAP BUMPER," filed on Mar. 20, 2022, the content of which is incorporated in its entirety.

BACKGROUND

Field of the Invention

The present invention relates generally to furniture bumpers, and, in particular, to bumpers that block the gap in between a couch and the floor.

Scope of the Prior Art

Many couches have a gap in between the couch and the floor. Toys and other household items can roll through this gap and get stuck. Pets often relieve themselves in the space beneath couches and cause scratching damage to the underside of the couch. Babies and children can get trapped or injured while searching for toys or exploring the space underneath couches.

Many solutions to keep household items, pets, and children from going into the space underneath couches have been put forth in the prior art. Some of these include:

Interconnectable rigid PVC or resin panels. Such panels, placed along an outer perimeter of a couch, can block the couch-floor gap. However, their out-in-the-open placement is aesthetically displeasing and can result in many stubbed toes while getting onto the couch. Furthermore, the panels have a fixed length and geometry, limiting customization and rendering them unsuitable for many couch arrangements. Connecting multiple panels to span a length of the couch creates multiple points of failure.

Elastic fabrics. Such fabrics, stretched along an outer perimeter of a couch frame, can block the couch-floor gap. However, they lack durability, require constant readjustment, do not provide an evenly taut surface across the length of the installation, and lack the strength to keep out pets and children.

Repurposed cushions, pillows, and the like. Such soft objects, placed along an outer perimeter of a couch frame, can block the couch-floor gap. However, their random geometries may result in an aesthetically displeasing look and leaves obvious gaps. Furthermore, the soft objects can be easily knocked over or removed by pets and children.

These prior art solutions, to effectively block the couch-floor gap, must be fixed in place to the floor, to couch frame edges, or to couch posts. This may require using unaesthetic and less-than-durable fastening methods such double sided tape, connectors, zip ties, and the like. Such methods also damage surroundings and are particularly ineffective on carpeted surfaces.

What is needed is a universal couch gap bumper that is sturdy, hidden, aesthetically pleasing, adjustable to fit a wide variety of couch arrangements, and effective at completely blocking access to the space underneath couches.

SUMMARY

The present disclosure satisfies the foregoing needs by providing, inter alia, a bumper for addressing each of the foregoing desirable traits as well as methods of its use.

One aspect of the present invention is directed at a bumper to block a gap in between the bottom of the couch and the floor. The bumper may comprise a flat, rectangular body segmented into flat, rectangular sections using parallel folds. A first section may be configured to lie horizontally on the floor. A second section may be configured to extend upwards. A third section may be configured to lie horizontally flush with the bottom surface of the couch frame. In certain embodiments, the outside of the second section may be dark or black in coloration.

The body may be made of one of corrugated paper, heavy paperboard, and/or cardboard. The height of the bumper may be adjusted by changing the angle in between the second section and the floor. Preferably, the angle is 45 degrees. The length of the body may be adjusted by truncating an end portion of the body.

This arrangement of bumper sections creates vertical strength through angled pressure between the bottom of the couch frame and the floor, which inherently generates resistance to inward pressure. Furthermore, various couch frame heights can be accommodated by simply adjusting the angle of the second segment and the size of the triangular truncation on the ends of bumpers.

Another aspect of the invention is directed at a bumper assembly to block a gap in between the bottom of the couch and the floor. The bumper assembly may be comprised of four bumpers in a quadrilateral arrangement, where each of the bumpers is perpendicular to adjacent bumpers.

The inwards extensions and optional colorations of the bumpers make the bumpers virtually invisible from within the room and prevents a user from stubbing a toe as he or she approaches the couch. The bumper is conveniently secured in place due to its attachment to the existing structure of the couch.

BRIEF DESCRIPTION OF THE DRAWINGS

The foregoing summary, as well as the following detailed description of preferred variations of the invention, will be better understood when read in conjunction with the appended drawings. For the purpose of illustrating the invention, there is shown in the drawings variations that are presently preferred. It should be understood, however, that the invention is not limited to the precise arrangements shown. In the drawings, where:

FIG. 4b is a bottom view of the bumper assembly of FIG. 4a.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations. Wherever convenient, the same reference numbers will be used throughout the drawings to refer to same or like parts.

Moreover, while variations described herein are primarily discussed in the context blocking a gap in between a couch and the floor, it will be recognized by those of ordinary skill that the present disclosure is not so limited. In fact, the principles of the present disclosure described herein may be readily applied to blocking gaps in between other furniture pieces and the floor.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

Now referring to FIGS. 1a-1e, one exemplary bumper 100 is illustrated and described in detail below. This bumper 100 is ideal for use on a side of a couch frame.

Figure 1A:
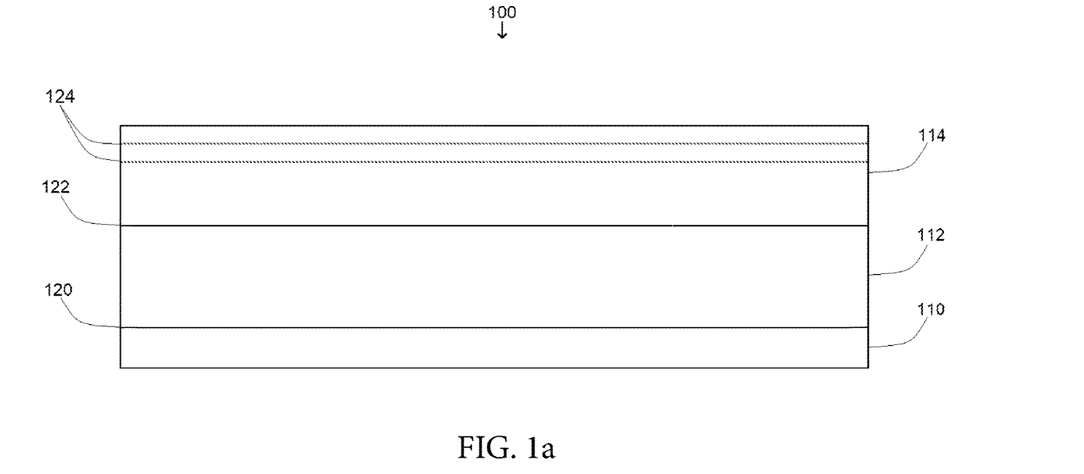
FIG. 1a is a front view of a bumper in its unfolded configuration, where cut lines are present to indicate optional rectangular truncations of the third section, according to an embodiment.

FIG. 1a shows the bumper 100 in its unfolded configuration from a front view. The unfolded bumper is flat and rectangular. A first parallel fold line 120 and a second parallel fold line 122 run across the bumper. The fold lines may be perforations and/or creases in the bumper body. The first section 110, second section 112, and third section 114 are separated by the parallel fold lines. The bumper 100 may have cut lines 124 on the third section 114 to indicate optional rectangular truncations. Such cut lines 124 may be printed, or otherwise applied, onto the outer surface (e.g., the surface visible during ordinary use) of the body of the bumper, where the markings indicate the specific rectangular truncations required for a certain setback of the bumper from an outside perimeter of a couch frame. Alternatively, instructions for how to create these rectangular truncations may be included with the installation instructions. Here, truncations made closer to the second parallel fold line 122 result in a narrower third section 114, and, thus, a smaller setback of the bumper 100 from an outside perimeter of a couch frame.

Figure 1B:
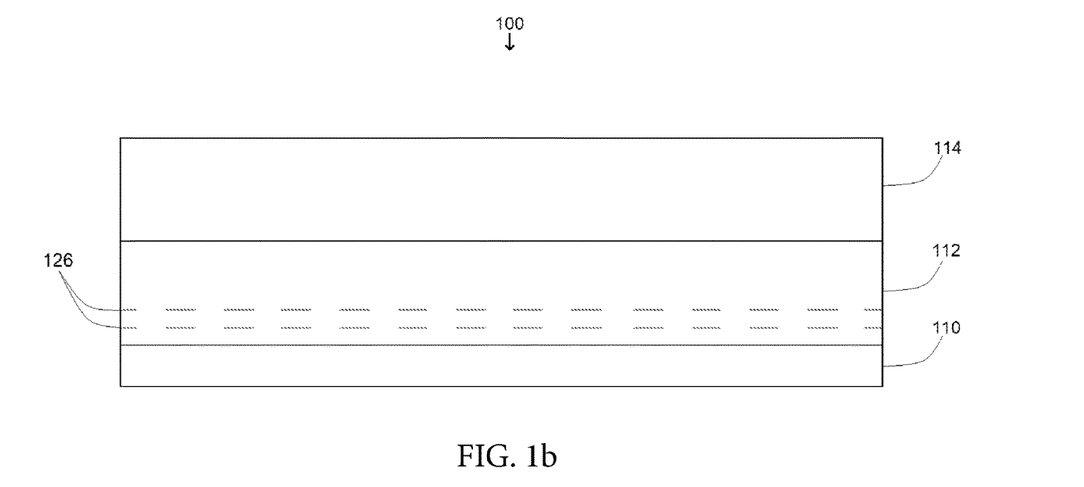
FIG. 1B is a back view of the bumper of FIG. 1a, where fold lines are present to indicate optional folds to separate the first and second sections, according to an embodiment.

FIG. 1B shows the bumper of FIG. 1a from a back view. The bumper 100 may have fold lines 126 on the second section to indicate optional folds. Such fold lines 126 may be printed, or otherwise applied, onto the inner surface (e.g., the surface not visible during ordinary use) of the body of the bumper, where the markings indicate the specific folds required for a certain couch frame height. Alternatively, instructions for how to create these rectangular truncations may be included with the installation instructions. The first and second sections can be separated by folding along one of the fold lines 126 as an alternative to folding along the first fold line 120. Here, folding along one of fold lines 126 results in a narrower second section 112, which may be better suited to fit shorter couch frames.

Figure 1C:
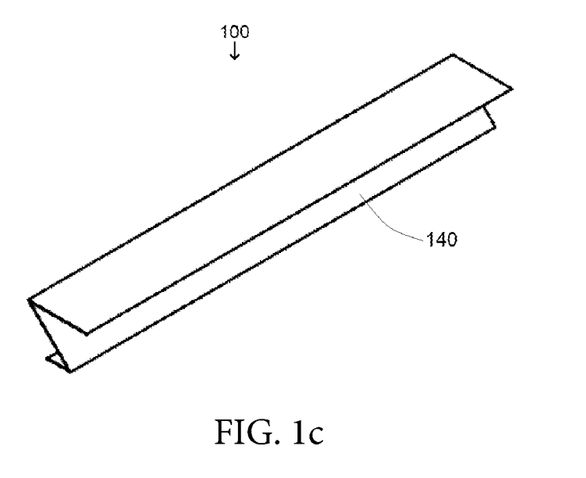
FIG. 1c is a perspective view of the bumper of FIG. 1a in its folded configuration, according to an embodiment.
Figure 1D:
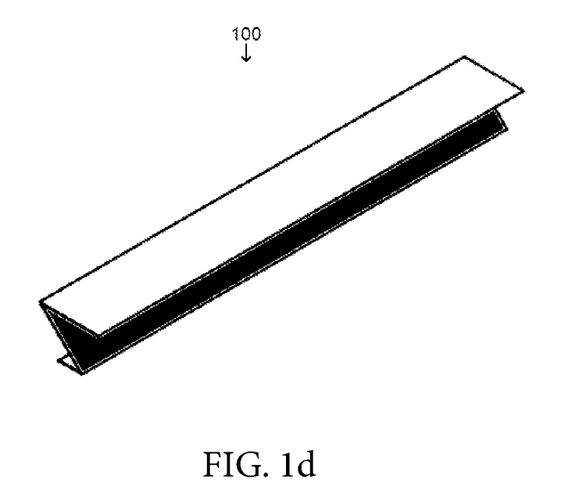
FIG. 1d is a perspective view of the bumper of FIG. 1a in its folded configuration, where the outside of the second section has a black coloration, according to an embodiment.

FIG. 1c shows the bumper 100 in its folded configuration from a perspective view. The bumper is folded along the first parallel fold line 120 and the second parallel fold line, resulting in three flat, rectangular sections. During ordinary use of the invention, only the outer surface 140 of the second section 112 is visible. As seen in FIG. 1d, the outer surface 140 of the second section 112 may have a dark or black coloration, providing the bumper a sleek, aesthetic appearance and minimizing the bumper's distractive interference. Alternatively, the outer surface 140 of the second section 112 may be colored or patterned as desired by a user.

Figure 1E:
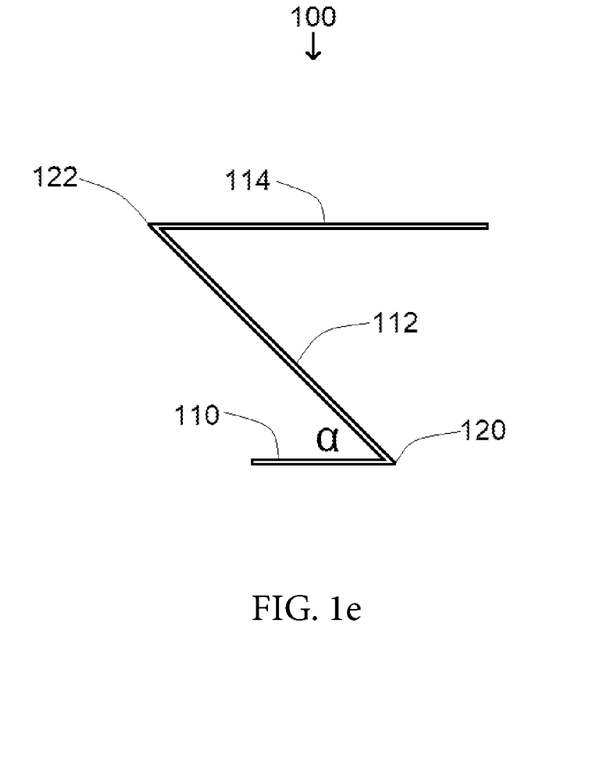
FIG. 1e is a left-side view of the bumper of FIG. 1a in its folded configuration, according to an embodiment.

FIG. 1e shows the bumper 100 in its folded configuration from a left-side view. The first section 110 is horizontal. The first section is configured to contact the floor in the space underneath a couch. The second section 112, connected to the first section 110 along the first fold 120, is configured to extend upwards at angle α. The third section 114, connected to the second section 112 along the second fold 122, is horizontal. The third section 114 is configured to lie horizontally flush with the bottom surface of the couch frame.

Figure 2A:
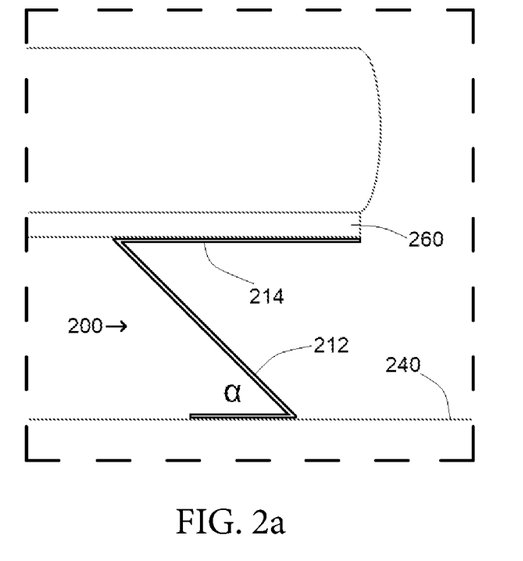
FIG. 2a is a left-side cross-sectional view of the bumper of FIG. 1e, positioned to block the gap in between a couch and the floor, according to an embodiment.

Now referring to FIG. 2a, the bumper of FIG. 1a is positioned to block a gap in between a portion of a couch frame 260 and the floor 240.

FIG. 2a shows the bumper 200 in its folded configuration, from a left-side cross-sectional view. According to an embodiment, the third section 214 may be firmly secured to the bottom surface of the couch frame 260 through physical or chemical means, including, but not limited to, staples, nails, adhesives, and the like. Here, the third section 214 is glued to the bottom surface of the couch frame 260. Angle α, the angle in between the second section 212 and the floor 240, is 45 degrees, ideal for standard height couch frames. Angle α can be adjusted to enable the bumper to fit higher or lower couch frames.

Figure 2B:
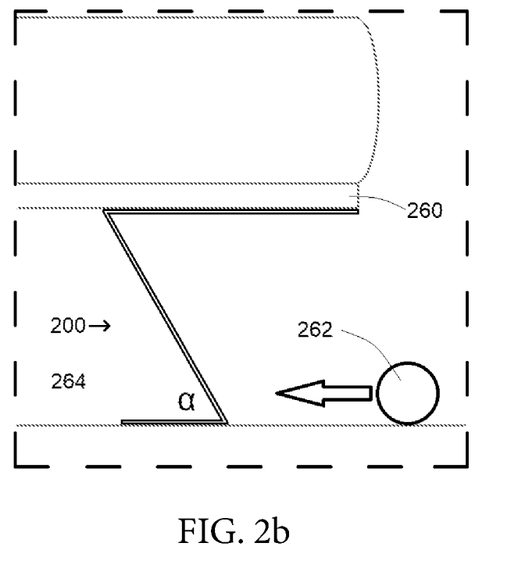
FIG. 2b is a left-side cross-sectional view of the bumper of FIG. 2a, where the angle between the second section and the floor has been increased.

FIG. 2b shows the bumper of FIG. 2a adjusted to fit a higher couch frame. Here, angle α is approximately 60 degrees. The bumper 200 blocks objects 262 from going into the space 264 underneath the couch.

Figure 3:
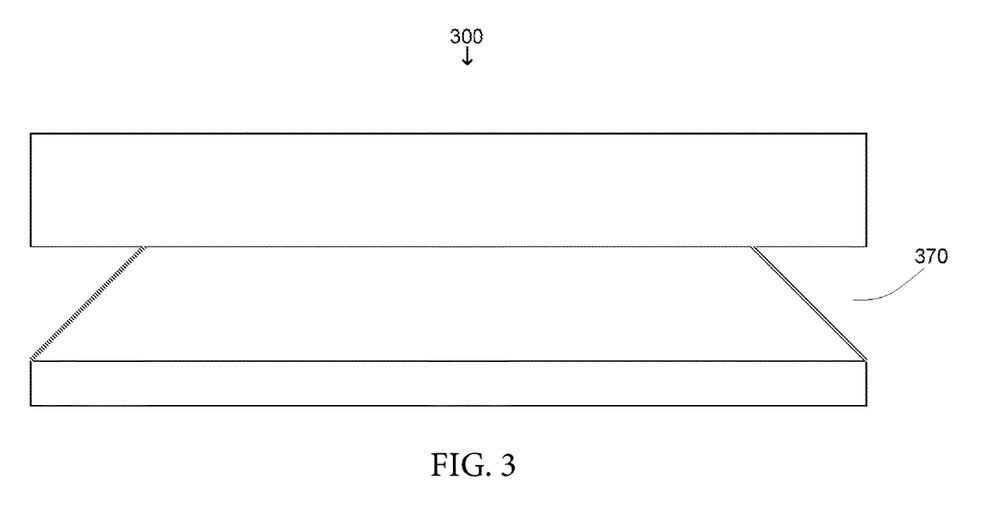
FIG. 3 is a front view of the bumper of FIG. 1a, where a user has cut triangular truncations into the second section of the bumper.

FIG. 3 shows the bumper of FIG. 1a, where a user has created triangular truncations in the second section. Instructions for how to create these triangular truncations may be included with the installation instructions.

Figure 4A:
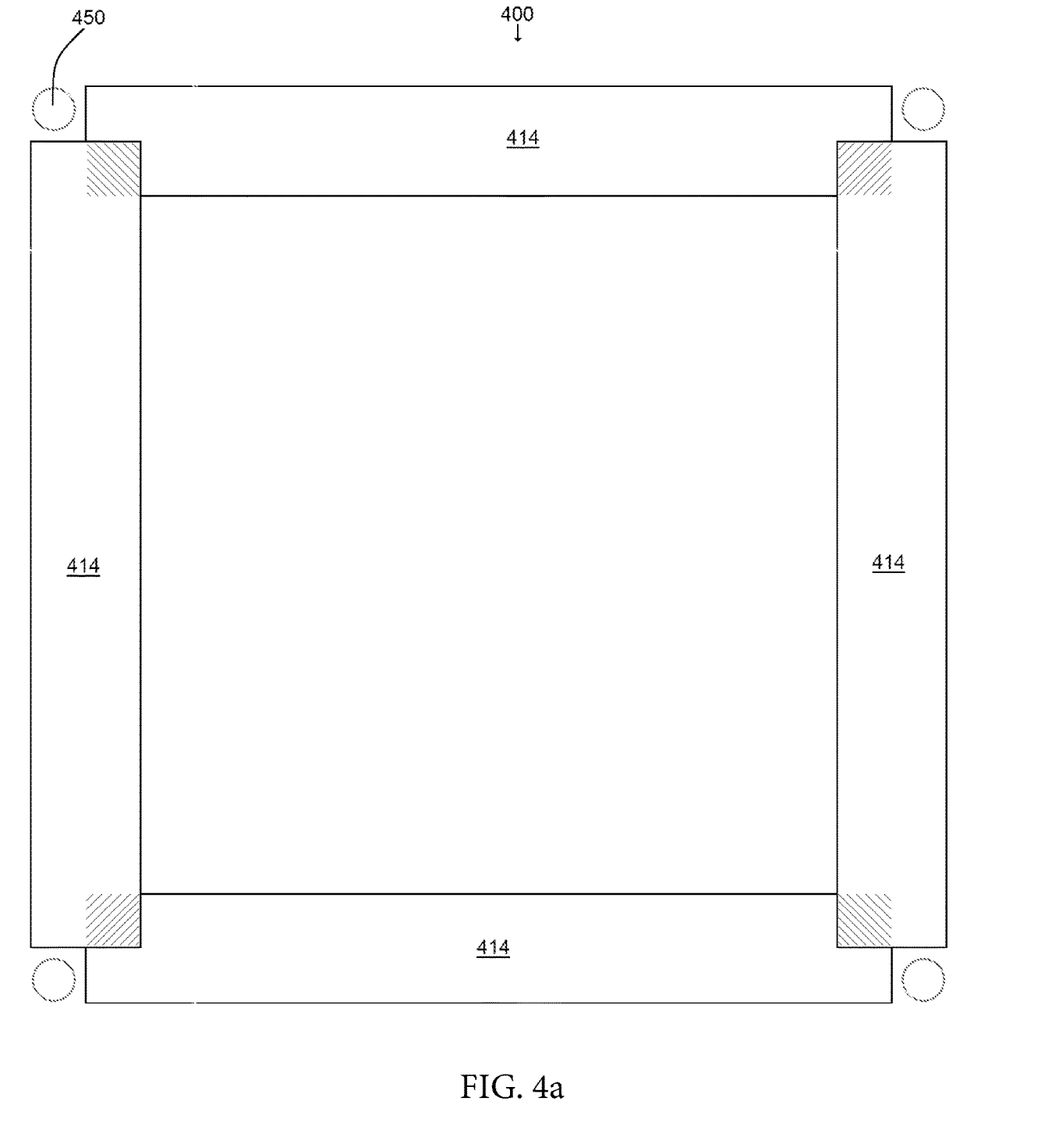
FIG. 4a is a top view of a bumper assembly, according to an embodiment of the present invention.

Bumpers may be arranged perpendicular to each other. For example, FIG. 4a shows a top view of a bumper assembly comprised of four bumpers. Here, each bumper is like the bumper in FIG. 1e and the bumpers are arranged in a quadrilateral formation, where adjacent bumpers are perpendicular to each other. Triangular truncations can be made to alternating ends of adjacent bumpers or both ends of each side bumper allowing the second sections 412 of each bumper to be placed flush to one another, covering any corner gaps.

Third sections 414 of each bumper may partially overlap at the corners (such as highlighted here with hash marks). According to an embodiment, third sections may be fastened to the bottom surface of the couch frame (not shown) by using staples, nails, adhesives, and the like, to connect third sections to the couch frame.

Figure 4B:
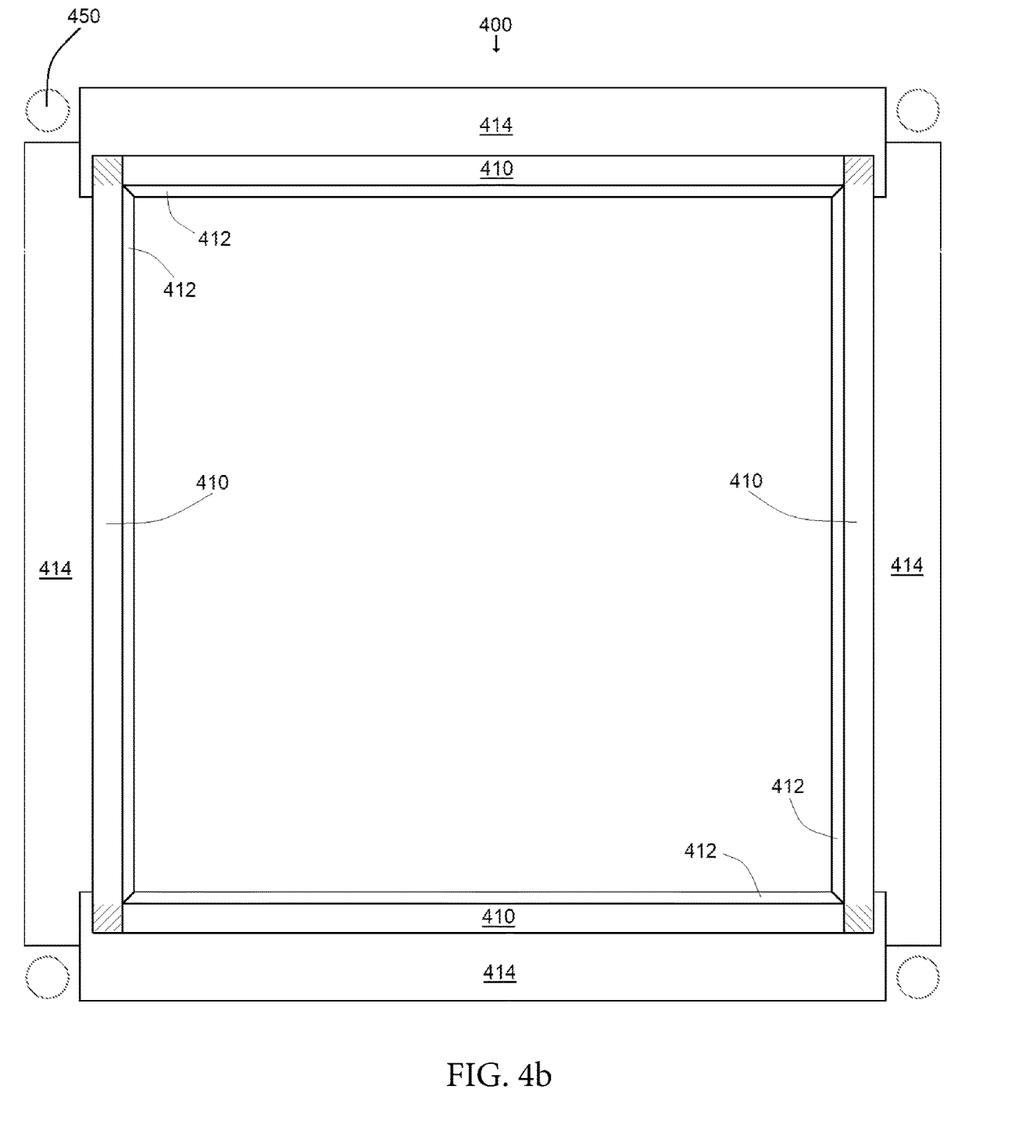

FIG. 4*b* shows a bottom view of the bumper assembly of FIG. 4*a*. First sections 410 of each bumper may partially overlap at the corners (such as highlighted here with hash marks). As shown in FIGS. 4*a*-4*b*, the bumper assembly can be placed under a couch such that each bumper fits in between couch legs 450.

Bumpers may be substantially made of corrugated paper, heavy paperboard, or cardboard. In yet another alternative embodiment, bumpers may be substantially made of any material that is durable and that can be folded into segments.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

I claim:

1. A bumper to block a gap in between a couch and flooring, the bumper comprising:
 a flat, rectangular body segmented into flat, rectangular sections using parallel folds, wherein
 a first section is configured to lie horizontally on the flooring;
 a second section, connected to the first section along a first parallel fold, is configured to extend upwards;
 a third section, connected to the second section along a second parallel fold, is configured to lie horizontally flush with a bottom surface of a couch frame; and
 an angle in between the second section and the flooring is approximately 45 degrees.

2. A bumper to block a gap in between a couch and flooring, the bumper comprising:
 a flat, rectangular body segmented into flat, rectangular sections using parallel folds, wherein
 a first section is configured to lie horizontally on the flooring;
 a second section, connected to the first section along a first parallel fold, is configured to extend upwards;
 a third section, connected to the second section along a second parallel fold, is configured to lie horizontally flush with a bottom surface of a couch frame; and
 a height of the bumper is adjusted by one of increasing and decreasing an angle in between the second section and the flooring.

\* \* \* \* \*